No. 774,171. PATENTED NOV. 8, 1904.
W. E. GARRIGUES.
PROCESS OF DISTILLING LIQUIDS.
APPLICATION FILED FEB. 1, 1904.
NO MODEL.
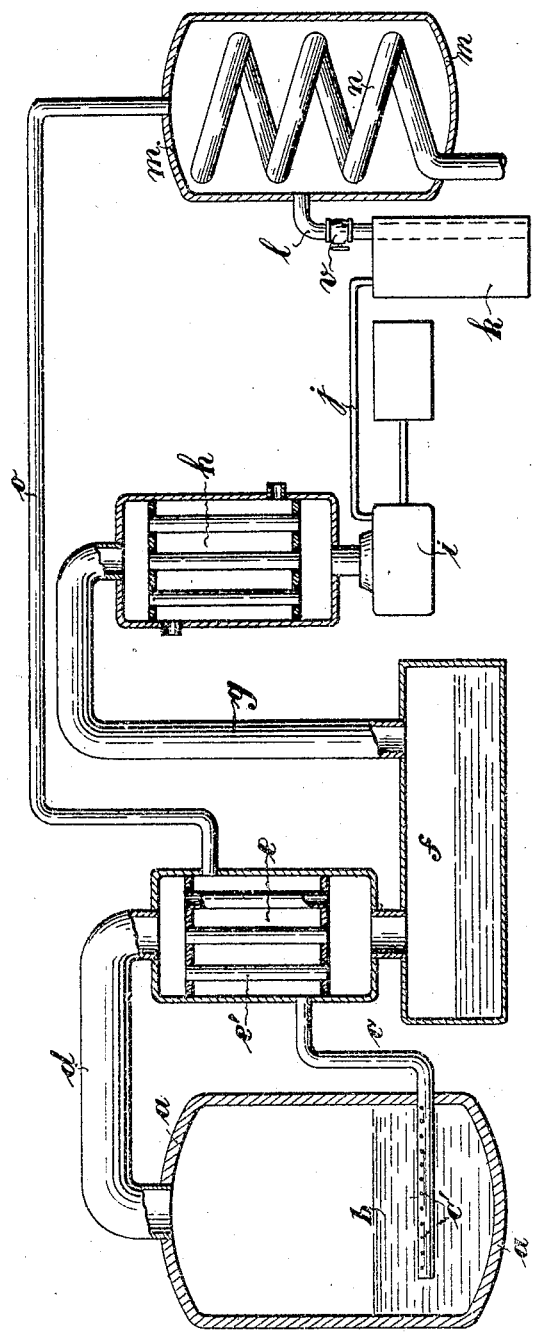
Witnesses
Max B. A. Doring.
Hatty B. Deedere.
Inventor
William E. Garrigues
By his Attorney
L. K. Böhm.

No. 774,171.

Patented November 8, 1904.

UNITED STATES PATENT OFFICE.

WILLIAM E. GARRIGUES, OF NEW YORK, N. Y.

PROCESS OF DISTILLING LIQUIDS.

SPECIFICATION forming part of Letters Patent No. 774,171, dated November 8, 1904.

Application filed February 1, 1904. Serial No. 191,456. (No specimens.)

*To all whom it may concern:*

Be it known that I, WILLIAM E. GARRIGUES, a citizen of the United States of America, and a resident of New York, in the county and State of New York, have invented certain new and useful Improvements in Processes of Distilling Liquids, of which the following is a specification.

This invention has reference to a novel process of distilling liquids.

It relates especially to a process of distilling liquids by steam or water vapors, and is particularly well adapted for such liquids which show a tendency to partially decompose when distilled directly or alone at normal pressure. Such liquids are distilled in a partial vacuum, whereby the boiling-point of the liquids is lowered in accordance with the degree of exhaustion. They may be distilled with steam or water vapors, which carry over same mechanically at a lower temperature than the normal boiling-point, or both methods may be combined for the purpose of preventing a partial decomposition of the liquids. In many instances it is desirable to use superheated steam. This is done for the purpose of distilling higher-boiling liquids without partially decomposing them.

Usually it is not feasible to completely condense the water-vapor and the vapor from the distilling liquid separately. In such cases if the liquid is miscible with water the water must be evaporated from the distillate to recover the distilled product water-free.

It is the object of my invention to economize heat in my novel process by utilizing the heat of the vapors of the distilling liquids for superheating water-vapors. These vapors arise from the condensed steam which has been used in the process of distilling. The use of these water-vapors in the process is another feature of my invention. It saves steam from a boiler which is used in the present methods, while the superheating of these vapors by the hot vapors of the distilling liquid saves heat from an outside source, as will be fully described farther down.

My novel process may be carried out by means of any suitable apparatus.

In the accompanying drawing a device is diagrammatically represented which illustrates the essential parts of an apparatus answering the desired purpose.

In the drawing, $a$ represents the still containing the raw product $b$, which latter may be automatically fed into the still as required. The still may be heated by any suitable means, such as a steam-coil immersed in the raw liquid or any suitable external source of heat. These are not shown in the drawing. A pipe $c$ for introducing superheated steam into the still reaches within same and, as shown, is provided with perforations $c'$. At the top of the still there is a gooseneck $d$, which connects with the superheater and condenser $e$, wherein the distilled liquid is condensed. The condenser connects below with the liquid-receiver $f$, from where a pipe $g$ leads to a surface condenser $h$, wherein the water-vapor passing through with some probable vapors of the distilling liquid is condensed. This condenser is in connection with a vacuum-pump $i$. The discharge of the vacuum-pump connects, by means of a pipe $j$, with an open-top tank $k$, through which a pipe $l$, with a regulating-valve $v$, leads into the evaporator $m$. Within the latter there is a worm $n$, which is heated by the exhaust-steam from the vacuum-pump. At the top of the evaporator a pipe $o$ leads over to the superheater $e$. On the lower portion of the other side of said superheater the pipe $c$ is secured, which delivers the superheated steam into the still.

From the above it is plainly seen that the water-vapor is in continuous circulation in the apparatus, making thus the process a continuous one.

Assuming that, for instance, glycerin is to be refined, then same is fed automatically into the still, to which external heat is applied. Now the air is exhausted from the entire apparatus by means of the vacuum-pump. The evaporator $m$ contains water or is filled with so-called "sweet water" from a previous distillation. The sweet water in the evaporator is heated by any suitable means, preferably by the submerged coil $n$, through which the exhaust-steam from the vacuum-pump flows. Under the reduced pressure existing in the apparatus by the operation of the vacuum-pump the sweet water in the evaporator boils easily and vapor passes out through the pipe $o$ into the superheater and condenser $e$. Here it passes around the hot condenser-pipes $e'$ and is superheated by the hot glycerin and steam vapors passing through them. From the superheater and condenser $e$ the superheated steam passes through the pipe $c$ into the still and is injected into the crude glycerin by means of the perforations $c'$. The steam thus injected causes the hot glycerin to distil over through the gooseneck. The glycerin-vapor mixed with steam-vapor passes now down through the condenser-tubes $e'$, located in the superheater. The water-vapors arising from the sweet water in the evaporator pass simultaneously around these tubes and are superheated there, whereby the temperature of the hot condensing vapors is reduced and the glycerin condensed, which then drops down into the glycerin-receiver $f$, where it is collected. As the sweet-water vapor is saturated steam and generated in a vacuum, its temperature is considerably below 212° Fahrenheit. The vapors coming from the still, however, have a temperature of about 325° Fahrenheit, the heat of the still being so regulated as to maintain the temperature of the vapors at about 325° Fahrenheit. Accordingly there is a great difference of temperature between the condensing hot glycerin and steam vapors coming from the still and the sweet-water vapors coming from the evaporator. Naturally the sweet-water vapors become superheated by passing around the condenser-pipes $e'$ within the superheater and condenser $e$. The vapor-passage from the evaporator through the superheater $e$ and perforations in tube or coil $c$ must be of sufficient size to allow of maintaining practically the same vacuum in the evaporator and the still.

The heat of the vapors arising from the still is absorbed in the superheater by the water-vapors arising from the evaporator. This causes a condensation of the greater part of the glycerin within the condenser-tubes $e'$, from where it drops into the glycerin-receiver $f$, which latter may be a plain tank. The glycerin here obtained is a finished product. The water-vapor which passes along with the glycerin-vapor, however, does not condense in the tubes $e'$ of the superheater. It passes along through the tube $g$ into the surface condenser $h$, which is externally cooled by water in the usual manner. Within the tubes of the surface condenser all the steam is condensed together with some glycerin-vapors carried along. This liquid is technically called "sweet water." From the surface condenser the sweet water drops down to the vacuum-pump and is removed by the latter to the open-top tank through the pipe $j$. From here the sweet water passes into the evaporator, owing to the reduced pressure in the system by means of the evacuation. From the evaporator the water-vapors arise again and circulate through the system again in the described manner, whereby a continuous circulation is created and a continuous process obtained. The small quantity of glycerin passing over with the water-vapor gradually accumulates in the sweet-water evaporator $m$. When the accumulation is sufficient to justify it, the valve $v$ is closed, stopping the feed of sweet water to the evaporator until the water therein has been evaporated from its contents. The glycerin remaining in the evaporator is then removed and constitutes a finished product or may be further purified by redistillation.

By utilizing the water-vapors from the evaporator and superheating them by means of the hot vapors of the distilling glycerin and injecting said superheated vapors into the crude liquid, as described, a great saving is effected and at the same time a continuous process is obtained.

Having thus described my invention, I claim as new and desire to secure by Letters Patent—

1. The process of distilling liquids in an atmosphere of steam consisting in condensing the water-vapors carried over with the distilling liquid in a previous distillation, reevaporating the water so recovered, and leading the steam arising from this evaporation into the still.

2. The process of distilling liquids in an atmosphere of steam consisting in condensing the water-vapors carried over with distilling liquid in a previous distillation, reëvaporating at less than atmospheric pressure the water so recovered, and leading the steam arising from this evaporation into the still.

3. The process of distilling liquids consisting in superheating steam by the heat of the vapors of the distilling liquid and injecting the superheated steam into the crude liquid to be distilled.

4. The process of distilling liquids which partially decompose when distilled under normal pressure consisting in first creating water-vapors at less than atmospheric pressure, then superheating same by the heat of the vapors of the distilling liquid and injecting the superheated vapors into the crude liquid to be distilled.

5. The process of distilling glycerin consisting in first creating water-vapors at less than atmospheric pressure then superheating same by the heat of the vapors of the distilling liquid and injecting the superheated vapors into the glycerin to be distilled.

6. The process of distilling liquids in an atmosphere of steam consisting in condensing the water-vapors carried over with the distilling liquid in a previous distillation, reevaporating the water so recovered, superheating the steam formed therefrom by the heat of the vapors of the distilling liquid, and injecting the superheated steam into the crude liquid to be distilled.

7. The process of distilling liquids which partially decompose when distilled under normal pressure, consisting in condensing the water-vapors carried over with the vapors of the distilling liquid in a previous distillation, reëvaporating at less than atmospheric pressure the water so recovered, then superheating the steam resulting from this reëvaporation by the heat of the vapors of the distilling liquid, and injecting the superheated steam into the crude liquid to be distilled.

8. The process of distilling glycerin in an atmosphere of steam consisting in reëvaporating at less than atmospheric pressure the water that has been condensed with distilling glycerin in a previous distillation, superheating said steam by the heat of the vapors of the distilling liquid and injecting the superheated steam into the crude glycerin to be distilled.

9. The process of distilling crude glycerin consisting in producing water-vapors from the sweet water in an evaporator at less than atmospheric pressure, conducting said vapors to a superheater and condenser where they are superheated by the heat of the vapors of the distilling glycerin, injecting then the superheated water-vapors into the raw glycerin in the still thereby causing distillation.

10. The process of refining crude glycerin consisting in producing water-vapors from the sweet water at less than atmospheric pressure, conducting said vapors through a superheater and condenser wherein same are superheated by the heat of the condensing vapors, injecting then the superheated vapors into the crude glycerin causing thereby distillation, condensing the glycerin-vapors from the still by superheating the water-vapors and collecting the refined product in a receiver.

11. The process of distilling crude glycerin consisting in creating water-vapors from the sweet water in an evaporator at less than atmospheric pressure, superheating said vapors by the heat of the vapors arising from the still, injecting said superheated vapors into the crude glycerin, causing thereby distillation, condensing the glycerin-vapor in tubes located within the superheater, collecting the refined glycerin in a receiver, allowing the water-vapors and some glycerin-vapor to pass along to a surface condenser, and condensing the sweet water there.

12. The process of refining glycerin consisting in creating water-vapors from sweet water in an evaporator at less than atmospheric pressure superheating same by the heat of the vapors arising from the still, injecting the superheated steam into the crude glycerin causing thereby distillation, condensing the glycerin-vapors by giving off their heat for superheating the water-vapors, collecting the refined glycerin in a receiver, condensing then the sweet-water vapors in an evaporator, stopping the supply of sweet water, evaporating the water therefrom and drawing off the remaining glycerin.

Signed at Detroit, Michigan, this 28th day of January, 1904.

WILLIAM E. GARRIGUES.

Witnesses:
FRANK MCELROY,
HOWARD C. MACK.